US00RE37675E

(19) United States
(12) Reissued Patent
Gueret

(10) Patent Number: US RE37,675 E
(45) Date of Reissued Patent: Apr. 30, 2002

(54) DISPENSING BOTTLE HAVING TWO OPENINGS

(75) Inventor: Jean-Louis H. Gueret, Paris (FR)

(73) Assignee: L'Oreal, Paris (FR)

(21) Appl. No.: 09/761,819

(22) Filed: Jan. 18, 2001

Related U.S. Patent Documents

Reissue of:
(64) Patent No.: 5,860,571
Issued: Jan. 19, 1999
Appl. No.: 08/781,228
Filed: Jan. 10, 1997

(30) Foreign Application Priority Data

Jan. 25, 1996 (FR) ..... 96 00862

(51) Int. Cl.[7] ..... B67D 5/32
(52) U.S. Cl. ..... 222/153.06; 222/209
(58) Field of Search ..... 222/185.1, 209, 222/212, 215, 153.06, 153.11, 153.14

(56) References Cited

U.S. PATENT DOCUMENTS

| | | | |
|---|---|---|---|
| 2,281,651 | A | 5/1942 | Wolcott |
| 2,281,738 | A | 5/1942 | Wolcott |
| 2,333,451 | A | 11/1943 | Sussman et al. |
| 3,145,879 | A | 8/1964 | Williams |
| 3,360,169 | A | 12/1967 | Susuki et al. |
| 4,109,836 | A | 8/1978 | Falarde |
| 4,162,030 | A | 7/1979 | Capra et al. |
| 4,770,305 | A | 9/1988 | Su |
| 5,377,877 | A | 1/1995 | Brown et al. |
| 6,152,328 | A | 11/2000 | Gueret |

FOREIGN PATENT DOCUMENTS

| | | |
|---|---|---|
| FR | 733 446 | 10/1932 |
| FR | 771 150 | 10/1934 |
| FR | 771 180 | 10/1934 |
| FR | 59 866 | 8/1954 |
| FR | 1 164 796 | 10/1958 |
| FR | 1 248 664 | 11/1960 |
| FR | 1 376 462 | 9/1964 |
| FR | 2 411 140 | 8/1979 |
| FR | 2 630 409 | 10/1989 |
| FR | 2 656 240 | 6/1991 |

OTHER PUBLICATIONS

English language Derwent Abstract of FR 2 411 140, Aug. 10, 1979.
English language Derwent ABstract of FR 2 630 409, Oct. 27, 1989.
English language Derwent Abstract of FR 2 656 240, Jun. 28, 1991.

*Primary Examiner*—Philippe Derakshani
(74) *Attorney, Agent, or Firm*—Finnegan, Henderson, Farabow, Garrett & Dunner, L.L.P.

(57) ABSTRACT

A reservoir body (101) contains a product (102) and is provided with at least two openings, one (P) of these openings being provided with a part (103) for increasing the pressure, and the other opening (R) being provided with a part (110) for braking and retaining the product (110). This device permits easy manipulation, allows a controlled dispensing, and optionally precise dosing, while ensuring a good preservation of the product over time.

100 Claims, 8 Drawing Sheets

DISPENSING BOTTLE HAVING TWO OPENINGS

Matter enclosed in heavy brackets [ ] appears in the original patent but forms no part of this reissue specification; matter printed in italics indicates the additions made by reissue.

BACKGROUND OF THE INVENTION

1. Field of the Invention

The invention relates to a dispensing bottle permitting a controlled and optionally metered dispensing of its contents while offering a comfortable grip. Moreover, the bottle may be provided with a sealing system which prevents degradation, in particular by air, of the product during its storage and/or between uses.

2. Description of the Related Art

In the pharmaceutical or cosmetic field, gels and creams are usually stored in pots provided with a simple lip and are taken up by dipping the finger directly in the pot. This practice has two drawbacks, i.e., microbial contamination introduced into the stored product, and the lack of precise metering of the product.

The use of a dropper bottle for metered dispensing of a liquid product is known. A dropper bottle usually comprises a reservoir having a squeezable bulb at one of its ends and a constricted opening at the other end. Air is expelled from the reservoir by actuating the bulb, the end having the constricted opening is immersed in a bottle containing the product to be metered, and the product enters the reservoir upon relaxation of the bulb. The product is subsequently dispensed by actuating the bulb.

Such dropper bottle systems are not suitable for the dispensing of products with a creamy consistency such as gels, or viscous products in general. Indeed, products of this consistency can only rise with difficulty through the constrictor, since air bubbles are drawn into the reservoir at the same time as the product, and a proportion of the product inevitably remains stuck on the outer wall of the dropper bottle. Moreover, with each use of the dropper bottle it must be assumed that the bottle has previously been opened, and hence that the product has been placed into contact with the oxygen of the air.

Bottles with deformable walls and a constricting end are also known, offering a metered dispensing of the contained product by simple pressure on the walls. These bottles, being manually compressed, have the drawback that they do not afford very precise dosing. Moreover, since their walls are deformable, they can only be carried in luggage with certain precautions, i.e., being protected from pressure and shocks. Although the addition of a leakproof closing system to the constrictor makes it possible to avoid accidental leakages, there still remains the risk of the walls of the bottle yielding under unduly high pressure. Furthermore, such bottles tend to become deformed in the course of time, in particular to keep the concave shape imparted by the manual pressure. The deformable plastic materials of which these bottles are made are not suitable for the packaging of luxury products for which more rigid materials are preferred. Moreover, the expensive products are dispensed in small quantities, and it is not known how to make bottles of a small size with deformable walls and offering a complete return of excess dispensed product.

For example, devices are known from U.S. Pat. No. 3,145,879, FR-A-733446, FR-A-1248664, FR-A-2411140, FR-A-1164796 and FR-A-771150 which comprise a reservoir cavity filled by a product to be dispensed, one end of the cavity comprising a pressure-increasing means, the other a braking system. However, none of these documents mentions any sealing device for single or semi-permanent use.

From U.S. Pat. No. 4,770,305 there is known a sealing device for single use applied to the top of the neck of a bottle. This device consists of an aluminum foil cover and a tip which can pierce this cover foil before the first use. However, this document does not suggest in any way the use of such a device in any application other than on the neck of a bottle.

FR-A-2656240 describes a semipermanent sealing device for the filling and dispensing a product contained in a reservoir formed by a flexible pouch. This document neither describes nor suggests the application of such a device to an application other than the filling and dispensing from a reservoir.

SUMMARY OF THE INVENTION

It is an object of the invention to provide a bottle with a rigidity allowing easy manipulation, provided with a dispensing system which permits a controlled dispensing, and optionally a precise dosing, of the product containing therein, irrespective of the viscosity of the product, while ensuring preservation of the product over time.

The above and other objects are achieved according to the invention by a bottle comprising a reservoir body containing a product and provided with at least two openings, the first (P) of these openings being provided with a pressure-increasing means, and the second opening (R) being provided with means for braking and retaining the product.

The product to be dispensed may be a paste, a cream, a gel, a liquid, loose powder, and generally any Galenic form, with the exception of a compact solid.

Preferably, the body of the bottle is chosen to have a sufficient rigidity so as not to be deformed under normal manual pressure in the usual conditions of use. For this purpose, a naturally rigid material is used as, for instance, glass or aluminum. It is also possible to use thermoplastic materials such as polypropylene, polyethylene, polystyrene, or copolymers of ethylene, of propylene, and/or of styrene, these materials having sufficient thicknesses to give them the desired rigidity.

A rigid bottle can also be made by means of a more flexible material, if this bottle is small and has angular shapes. Thus the product contained in the reservoir included in the body of the bottle cannot flow out under the effect of any accidental pressure exerted on the body of the bottle.

In the absence of pressure-increasing means and braking and retaining means provided by the present invention, rigid bottles, irrespective of the reason for their rigidity, usually do not permit a proper emptying of their contents.

During the packaging of the bottle, the product is introduced into the container body. The braking and retaining means, which is chosen according to the nature of the product, prevents the product from emerging from the bottle in the absence of pressure.

According to another aspect of the invention, the bottle comprises a body forming a reservoir in which there is stored a product, a pressure-increasing means, a means for fixing the pressure-increasing means on the first opening P of the reservoir ending in a neck, and optionally a cover cap $C_R$, the cover cap $C_R$ cooperating with the second end of the bottle where the constrictor is placed.

The invention more particularly concerns fluid products such as lotions, in particular milks and shampoos, gels, creams, foams, the dispensing of which is intended to be controlled. This invention concerns, in particular, cosmetic or therapeutic use and, as a general rule, products of a high price and where it is desirable to prevent wastage. The bottles in accordance with the invention permit a controlled dispensing, and optionally metering, of such products.

In accordance with the invention, the unit constituted by the body, by the means for fixing the neck, and by the pressure-increasing means is provided with a sealing device which ensures that the contents of the reservoir do not come into contact with air during the whole duration of storage, and possibly even between two successive uses. Moreover, the bottles in accordance with the invention prohibit any direct contact between the manipulator and the inside of the reservoir. Thus the risks of microbial contamination are extremely limited. The sealing device may be constituted by the pressure-increasing means, by the first end P of the bottle and by the fixing means, and comprises at least one sealing means for single or semipermanent use.

Such a sealing means for single use which can be used in the present invention consists, for example, of a tearable or pierceable obturating cover which, during the first use, is pierced or torn by actuation of the pressure-increasing means. This obturating cover is, for example, constituted by an aluminum foil or by a polyethylene film, or is made of any other material that can be easily torn. The pressure-increasing means is provided with a striker which pierces or tears the cover when pressure is applied to the pressure-increasing means.

A ball, not secured to the pressure-increasing means, may also be placed into the space provided between the cover and the pressure-increasing means, and may come to bear on the cover and tear it when pressure is applied to the pressure-increasing means. This cover may be fixed in any way to the pressure-increasing means, to the neck of the bottle, to the fixing means or to the bonding or welding means which hold the parts fixed to one another. Moreover, the cover must advantageously be made of a material which is impermeable to air and to the constituents of the formula, so as to prevent the formula from migrating out of the reservoir during storage; this material must, moreover, be chemically inert in relation to the formula used.

Such semipermanent sealing means may be constituted by a fixing device which has two positions, i.e., an open position and a closed position, and which can be actuated by a simple movement. Advantageously, such a device is constituted by at least two parts joined and secured, one to the neck of the bottle, and the other to the pressure-increasing means. These two parts may be placed in two different relative positions by a straightforward movement of one of these parts. In one of these two positions, a passage or duct traversing the fixing means causes the pressure-increasing means to communicate with the reservoir. In the other position, this passage or duct no longer exists, or it is obturated, and the seal between the pressure-increasing means and the reservoir is leakproof. Such sealing means, well known to those skilled in this art, are operated for an opening or closing movement by rotation, or by vertical, horizontal or lateral displacement, or by rocking.

The sealing device may also comprise a membrane permeable to air and impermeable to liquid, which prevents the product from rising up as far as the pressure-increasing means.

The neck of the bottle at the end having the first opening P may comprise a constricted part so as to limit the possibility of the product rising up as far as the pressure-increasing means. For example, the pressure-increasing means and the reservoir may communicate by a narrow duct such as a capillary duct.

Preferably, the capacity of the pressure-increasing means is smaller than the volume of the bottle. Thus the product can be dispensed in a controlled manner. Usually, the capacity of the pressure-increasing means is chosen in the range of from 0.1 ml to 5 ml. Preferably, the capacity of the pressure-increasing means ranges from 0.2% to 25% of the volume of the bottle. Thus it is not likely that high pressures which could entail a heavy discharge from the bottle will be accidentally exerted on the pressure-increasing means. The capacity of the pressure-increasing means is adjusted according to the rheology, in particular the viscosity, of the product and the usual dose used for this product, as is known in the art.

Preferably, the pressure-increasing means is formed by a bulb of an elastomeric material, a piston, or a bellows connected to the first opening P by means of a conventional fixing means, e.g., by catch-engagement or by screwing. If the pressure-increasing means is formed by a bulb, it may be of any shape. Optionally, the pressure-increasing means may be surmounted by a push button made of a rigid material.

Preferably, the unit constituted by the pressure-increasing means, the fixing means and the neck is partly encapsulated in a rigid part. This encapsulation makes it possible to partly protect the pressure-increasing means from shocks; it affords a better seal for the fixing of the pressure-increasing means on the neck of the body, as well as a better grip of the dispensing bottle. This encapsulation may be obtained by any conventional means, e.g., by overmolding (composite molding) the rigid part around the unit constituted by the pressure-increasing means, the fixing means and the neck.

The rigid part is constituted of any rigid material, e.g., a thermoplastic material such as polypropylene, polyethylene, polystyrene, and the copolymers of ethylene, propylene and/or of styrene. These materials are used with sufficient thicknesses to give them the desired rigidity.

Optionally, the rigid part and the elastomeric bulb may be molded as a single piece of thermoplastic material whose thickness varies according to the desired rigidity. The rigid part may also be constituted by two distinct parts, which are assembled around the unit constituted by the pressure-increasing means, by the fixing means and by the neck, by screwing, or by catch-engagement, or by bonding, or by any other conventional means.

Optionally, the part made of a rigid material may have a lid for protecting the pressure-increasing means.

When the pressure-increasing means is partly encapsulated in the rigid part, the encapsulation is obtained in such a way that the pressure-increasing means is disposed inside a hollow cavity arranged in the rigid part, and that the pressure-increasing means is even with the surface of the rigid part, or that it is substantially recessed relative to this surface. Thus when the user is holding the bottle in his hand, he must intentionally reach the pressure-increasing means with his finger and does not risk actuating it in error. Moreover, the advantageous rigid nature of the bottle unit permits a good grip by the user. When the bottle is placed inside luggage, the rigid part protects the pressure-increasing means and prevents the latter from being actuated accidentally.

According to a variant of the invention, the bottle can be provided with two pressure means placed symmetrically relative to the first opening P in order to facilitate the manipulation of the bottle. This variant makes it possible to exert simultaneous pressure with the thumb on one side and with another finger, preferably the index finger of the same hand, on the other side of the bottle and affords the user a good grip associated with very good control of the delivery.

The constrictor permitting the dispensing of the product is chosen according to the product to be dispensed. The diameter of its dispensing duct is chosen according to the rheology, and in particular the viscosity, of the product, so that in the absence of pressure on the pressure-increasing means the product does not spontaneously flow out through this duct.

Preferably, the constrictor has at its outlet inside the bottle, a retaining cell open towards the reservoir in such a way that some of the product is retained inside this cell in the normal positions of use of the bottle (e.g., a vertical position with the constrictor disposed towards the bottom, a horizontal position, and any intermediate position). The inlet and the outlet of the constrictor are defined by the direction of flow of the product. This retaining cell may, for example, be constituted by the walls of the constrictor if, in relation to the viscosity of the product, the constructor has sufficient length relative to its width to ensure a good retention, or by a duct extending in the reservoir which extends the walls of the constrictor. It may also be formed by an annular flange at the inlet of the cell.

The retaining cell makes it possible to keep a small quantity of the product available for immediate dispensing, even if the bottle has been stored in a position other than with the constrictor at the bottom. This reserve quantity, if of sufficient height, makes it possible to prevent the passing of air contained in the reservoir through the product when the pressure-increasing means is actuated. Finally, the retaining cell permits a better draining of the contents of the bottle.

The constrictor and the body of the bottle may constitute only a single part with the constrictor forming the extension of the bottle, but they may also consist of two parts with the constrictor being screwed or clipped in a leakproof manner onto the mouth of the bottle. At the dispensing end of the constrictor there may be located an obturator means which obturates the constrictor in the absence of pressure and folds under the thrust of the product. The obturator may consist of an elastic lip or an elastic valve whose flanges diverge under the pressure of the product. Such a valve consists of a flat or circular nozzle made of an elastomeric material, one end of which is slipped over the rigid end of the constrictor, and the other end is pierced by a wider or narrower opening which remains closed in the absence of pressure.

The constrictor may instead be obturated by a flat deformable gasket placed at the bottom of the cover cap. The constrictor may also be obturated in a leakproof manner by a service cap system forming part of the cover cap. Moreover, the outlet end of the constrictor may be provided with any means facilitating the dispensing of the product, e.g., an applicator made of foam, a massaging surface, a ball, a spatula or a brush.

According to a variant of the invention, the constrictor may comprise several ducts for the simultaneous dispensing of the product. Preferably, the constrictor has from one to three ducts.

The cover cap of the service cap may be fixed to the bottle or to the constrictor by any known, such as catch engagement, by screwing, by means of a bayonet fastener, etc.

As indicated above, the pressure-increasing means may be fixed to the neck of the bottle which ends in the first opening P by means of the fixing means. This fixing is preferably leakproof in such a way that pressure exerted on the pressure-increasing means is integrally retransmitted into the body of the bottle and is reflected in a flowing out of the product. The fixing of the pressure-increasing means on the neck may be ensured by the pressure-increasing means itself. For example, the pressure-increasing means may be extended in a skirt which has a profile complementary to the profile of the neck of the bottle. The fixing of the pressure-increasing means on the neck of the bottle may also be ensured by a rigid ring molded or not over the pressure-increasing means.

According to a variant of the invention, the lid of the rigid part may comprise a hinge and be molded as a single piece together with the rigid part, the pressure-increasing means being fixed to the lid by any known means. Moreover, the pressure-increasing means may also be molded as a single piece with the lid of the rigid part.

Preferably, the bottle comprises an air restoring or venting means. Thus air return to the inside of the bottle after use may be effected through the constrictor, for example, by means of a cap capable of a renewed air intake. It may also be effected by the pressure-increasing means by means of a renewed air intake valve situated between the pressure-increasing means and the ambient air. The pressure-increasing means may also be provided with a hole which may be obturated by the finger for dispensing and which lets air pass when the finger is removed from the pressure-increasing means. In the case where the renewed air intake is not effected by means of the constrictor, the bottle is then provided with a non-return valve, for example at the neck or the fixing means, which prevents the product from again rising up as far as the pressure-increasing means.

The cover cap $C_R$ which closes the dispensing end (outlet) of the bottle has any shape. Preferably, this lid has a flat face which allows the bottle to be stored upside down. Thus, with the product descending by gravity into the mouth of the constrictor, the bottle is always ready for use.

The pressure-increasing means is placed anywhere on the top of the bottle or laterally relative to the bottle. When the pressure-increasing means is positioned at the top of the bottle, it may be placed coaxially with the constrictor or along an axis different from that of the constrictor.

BRIEF DESCRIPTION OF THE DRAWINGS

To render the invention more readily understood, devices meeting the characteristics of this invention will be described below by way of example. Except in a special case, the upper parts (the neck and parts attached to the neck) and the lower part (the constrictor and the part cooperating with the constrictor) of the bottle are independent and it is possible to combine all the variants of these two parts of the bottle in the examples that follow, wherein.

DETAILED DESCRIPTION OF THE PREFERRED EMBODIMENTS

Figure 1:
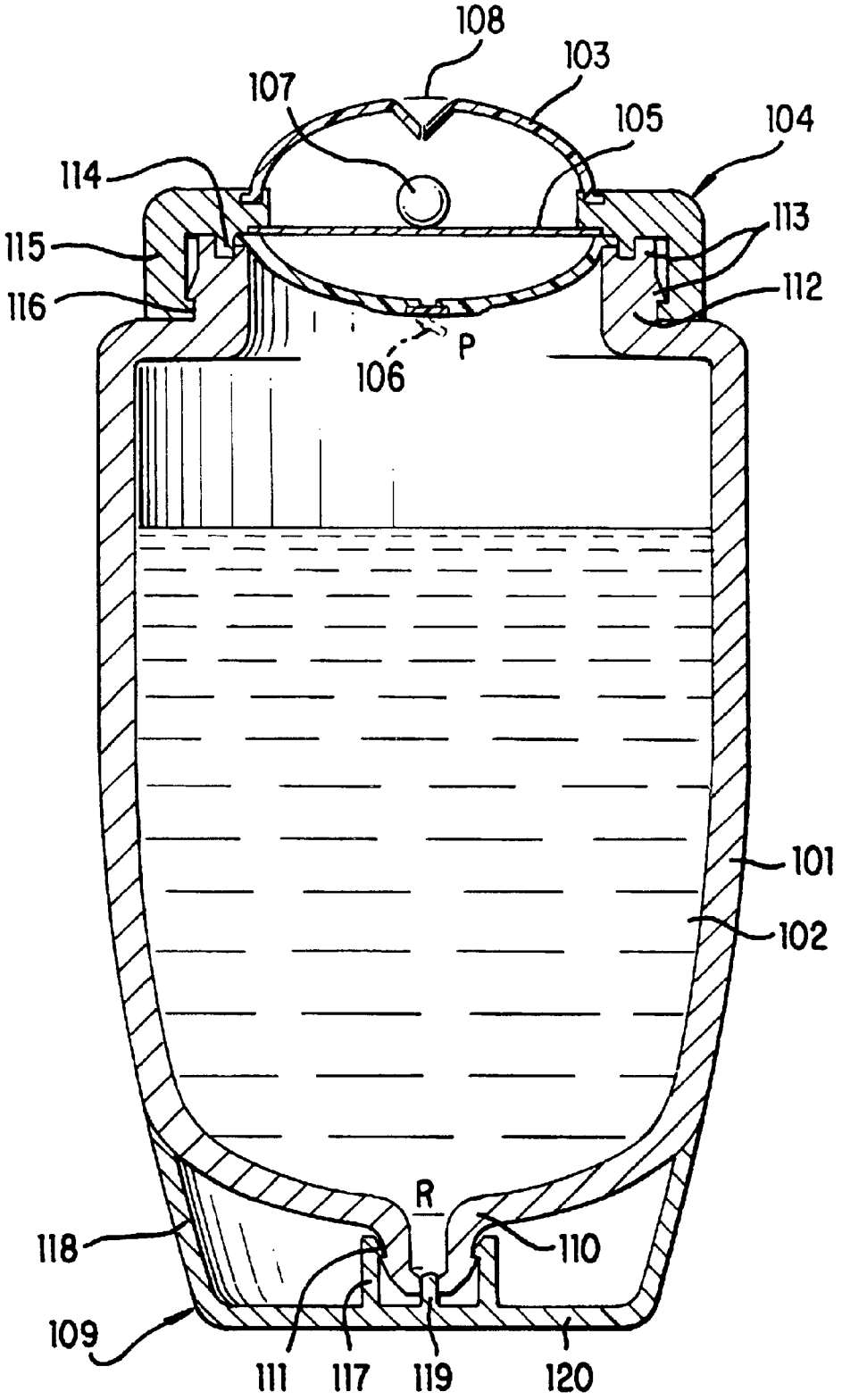
FIG. 1 is a longitudinal sectional view of a bottle in accordance with the invention.

The device shown in FIG. 1 comprises a glass container body 101 containing the product 102, a bulb 103 made of an elastomeric material, a ring-shaped collar 104 for fixing the bulb 103 on the neck 112 of the bottle, an obturator 105, a non-return valve 106, a striker 107 and a cap 109. The non-return valve 106 prevents the product in the container body 101 from being discharged through the bulb 103 and so acts as a sealing device.

The body of the bottle is extended on one side in a constrictor 110 provided with an outlet opening R for the product and having a profile 111. On the other side, a neck 112 has groove 113 for fastening the ring 104 on the outer surface, and an air intake opening P. The bulb comprises a renewed air intake valve 108 at its center, and is molded over its whole circumference by the collar ring 104. The collar ring 104 is made of a rigid material and is provided with an internal cylindrical skirt 114 which is fitted in the fastening groove 113 of the neck 112, and an external skirt 115 with an internal diameter substantially equal to the external diameter of the neck 112 and comprising a fastening groove 116 complementary to that the neck 112.

The obturator 105 is formed by an aluminum foil welded to the ring 104 at the circumference of the bulb and together with the ring obturates the opening P. The ball 107 is placed between the bulb and the obturator so that at the time of first use, pressure exerted on the bulb causes the obturator to be torn by impact on the ball.

The cap 109 is provided with an internal cylindrical skirt 117, an external skirt 118 and a stud 119 which are coaxial. The external skirt 118 has a profile which cooperates with the body of the bottle, the internal skirt 117 has a profile which cooperates with the profile 111 of the constrictor, and the stud 119 penetrates into the opening R, obturating it, when the cap 119 is mounted on the bottle. The cap is provided with a flat bottom 120 which permits the vertical storage of the bottle with the end R towards the bottom. Thus, the bottle is always ready for use.

Figure 2A:
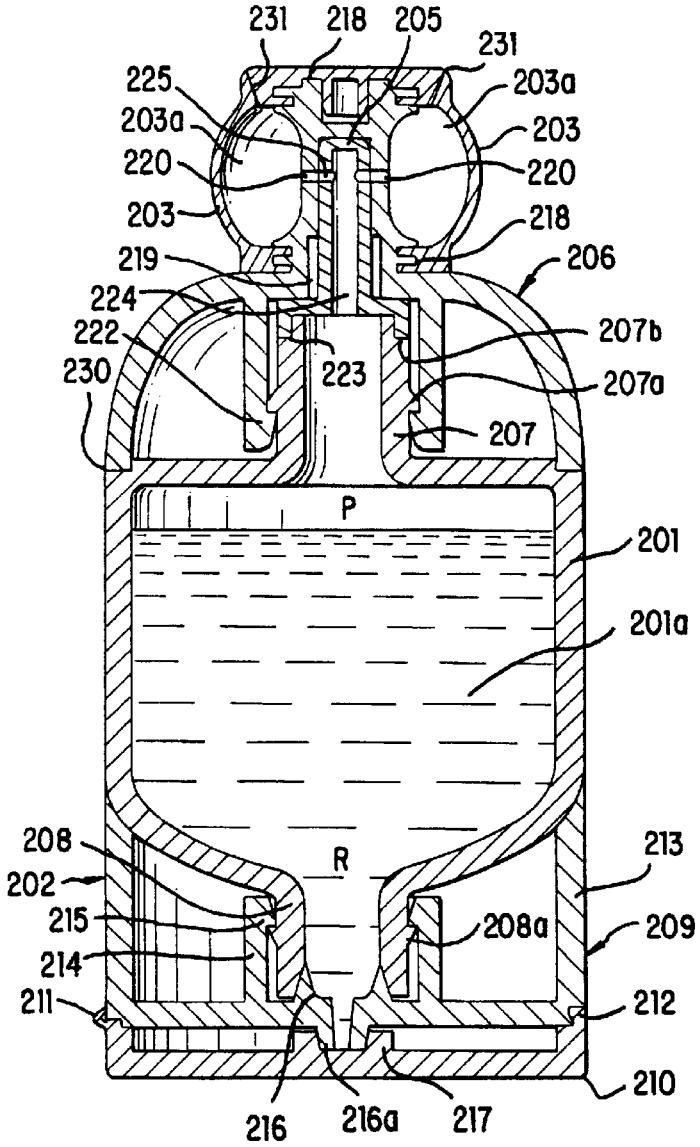
FIGS. 2A and 2B show a longitudinal sectional view of a bottle in accordance with the invention, comprising two bulbs, a service cap, an elastic cap and an opening closing system operated by rotation.

The device shown in FIG. 2A comprises a glass reservoir-bottle 201 containing a product 201a, a service cap 202 on the side of the constrictor 216, a double bulb 203 made of polyethylene on the opposite side to the constrictor, and a rotary opening-closing system formed by a fixed part 205 and a movable part 206. The end P of the bottle ends in a neck 207 provided with fastening means 207a. The other end R ends in another neck 208 provided with fastening means 208a.

Figure 2B:
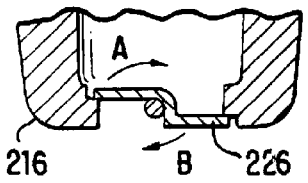

The service cap has a body 209 and a cover cap 210 connected by a hinge 211. The cover cap 210 has fixing means 212 allowing it to be fastened on the body of the service cap. The cap has an external skirt 213 whose end on the opposite side to the cap 210 cooperates with the body 201 of the bottle and an internal skirt 214 coaxial with the skirt 213 and provided with fastening means 215 complementary with the fastening means 208a of the neck 208. The body 209 of the service cap has an opening forming the constrictor 216. The opening is obturated by an elastic lip 226 (FIG. 2B) made of an elastomeric material overmolded around the constrictor 216. The constrictor 216 extends the neck 208. The cover cap 210 of the service cap comprises a cylindrical internal skirt 217 within which the constrictor 216 may be positioned.

When the cover cap 210 of the service cap is in the closed position as shown in the Figures, the end 216a of the constrictor is inserted in the internal skirt 217 of the cover cap and rests on the bottom of the cover cap so as to ensure a leakproof seal. When the service cap is open, the elastic lip 226 can let the product pass (opening, direction B)due to pressure exerted on this product. When this pressure stops, the lip 226 allows air to pass (opening, direction A) due to the low pressure in the bottle.

The two bulbs 203 are molded in a single piece, folded during assembly at the hinges 231 and fixed by catch-engagement 218 at their two ends around the movable part 206 of the rotary opening-closing system. The movable part 206 is traversed by a main duct 219, through which extends the fixed part 205, and by two radial lateral ducts 220. The duct 219 opens to end P of the bottle. Each of the ducts 220 extends between the cavity 203a of one of the bulbs and the transverse duct 225 of the fixed part 205 when in the open position. The movable part 206 is, moreover, provided with fastening means 222 cooperating with (catch-engagement) fastening means 207a of the neck 207 at the end P, and is in bearing contact with a shoulder 230 of the body of the bottle. These means 207a permit the rotation of the part 206 around this neck.

The fixed part 205 is fixed to the neck 207 by (catch-engagement) fastening means 223 complementary to those 207b of the neck 207. It is traversed by the main duct 224 which extends the neck 207 of the bottle and by the transverse ducts 225 opening out in the duct 224 at the level of the lateral duct of the movable part 206. Since the movable part 206 is capable of turning around the neck 207, it can be positioned in two preferable positions determined by stops (not shown) located on the neck 207. In an open position, the transverse duct 225 is opposite the lateral ducts 220 and any pressure exerted on the bulbs 203 is transmitted to the inside of the bottle and then to the outlet of the constrictor 216. In the closed position, the transverse duct 225 is perpendicular to the lateral ducts 220 and any pressure on the bulbs cannot be transmitted.

Figure 3A:
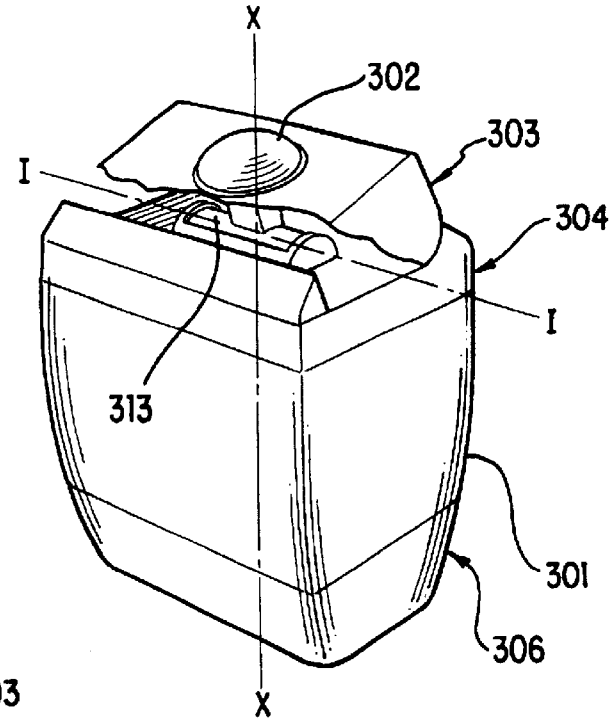
FIGS. 3A, 3B and 3C, being respectively a perspective, a longitudinal section, and a partial longitudinal section, show a bottle in accordance with the invention provided with an applicator made of foam and an opening and closing system operating by means of a pivot.
Figure 3B:
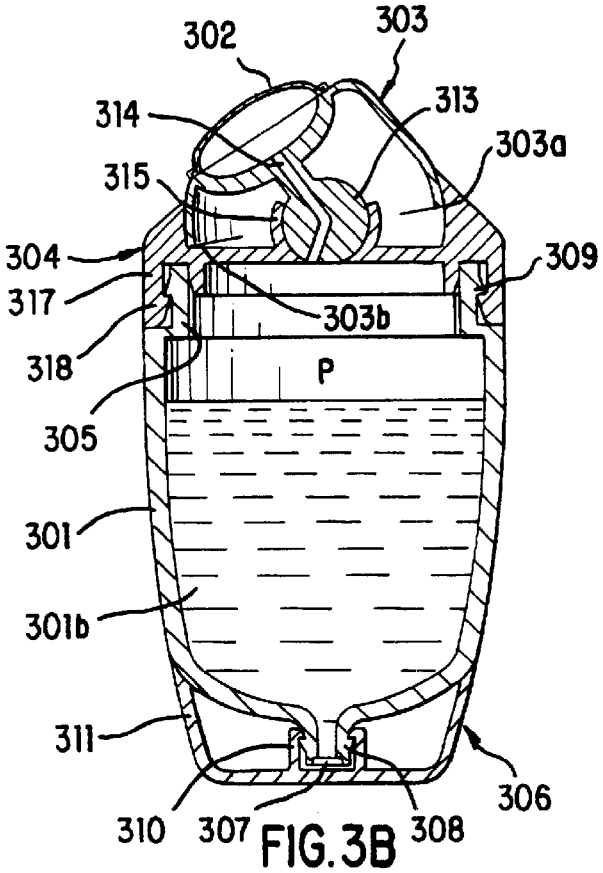
Figure 3C:
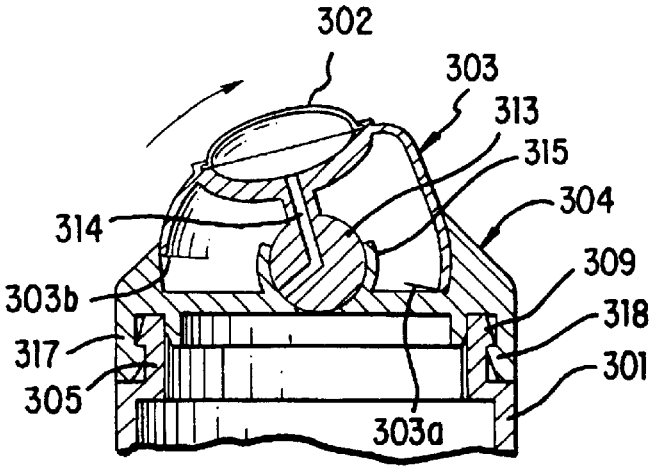

The device shown in FIGS. 3A to 3C comprises a reservoir bottle 301 containing a product 301b, an elastomeric bulb 302 overmolded by a part 303 with a triangular cross-section made of polypropylene, a part 304 made of polypropylene fixed to the neck 305 of the bottle, a cover cap 306 and an applicator 307 made of foam.

The bottle ends on one side in a constrictor 308 provided with an opening R within which is placed the foam applicator 307, and on the other side by the neck 305 whose end defines the outlet opening P. The neck 305 is provided with fastening means 309 (catch engagement) on the outer surface. The cover cap 306 has an internal skirt 310 and an external skirt 311 which are coaxial and cooperate respectively with the constrictor and the body of the bottle.

The round bulb 302 is overmolded on its circumference by the part 303. The part 303 is provided with a central ball and socket joint 313 allowing it to pivot round the axis I—I, perpendicular to the longitudinal axis X—X of the bottle. This ball and socket joint 313 is traversed by a duct 314 and cooperates with a complementary part 315 of the part 304. The complementary part 315 has an opening, which could also take the form of a duct, communicating the neck 305 of the bottle and the ball and socket joint.

The part 304 is provided with a virtually parallelepiped shaped skirt 317 comprising (catch-engagement) fastening means 318 complementary to those 309 forming part of the neck 305 of the bottle. The two parts 303 and 304 cooperate with one another via the ball and socket join 313 so as to define two preferred positions corresponding to the edges 303a, 303b of the part 303 resting on the part 304. In one of these positions, the duct 314 and the opening in part 315 are opposite one another and a pressure on the bulb is transmitted to the reservoir containing the product 301b and then to the constrictor. In the other position, the duct 314 and the opening 316 do not communicate. Thus any pressure on the bulb 302 remains without effect, and it is possible to close an open bottle merely by rocking the part 303.

Figure 4:
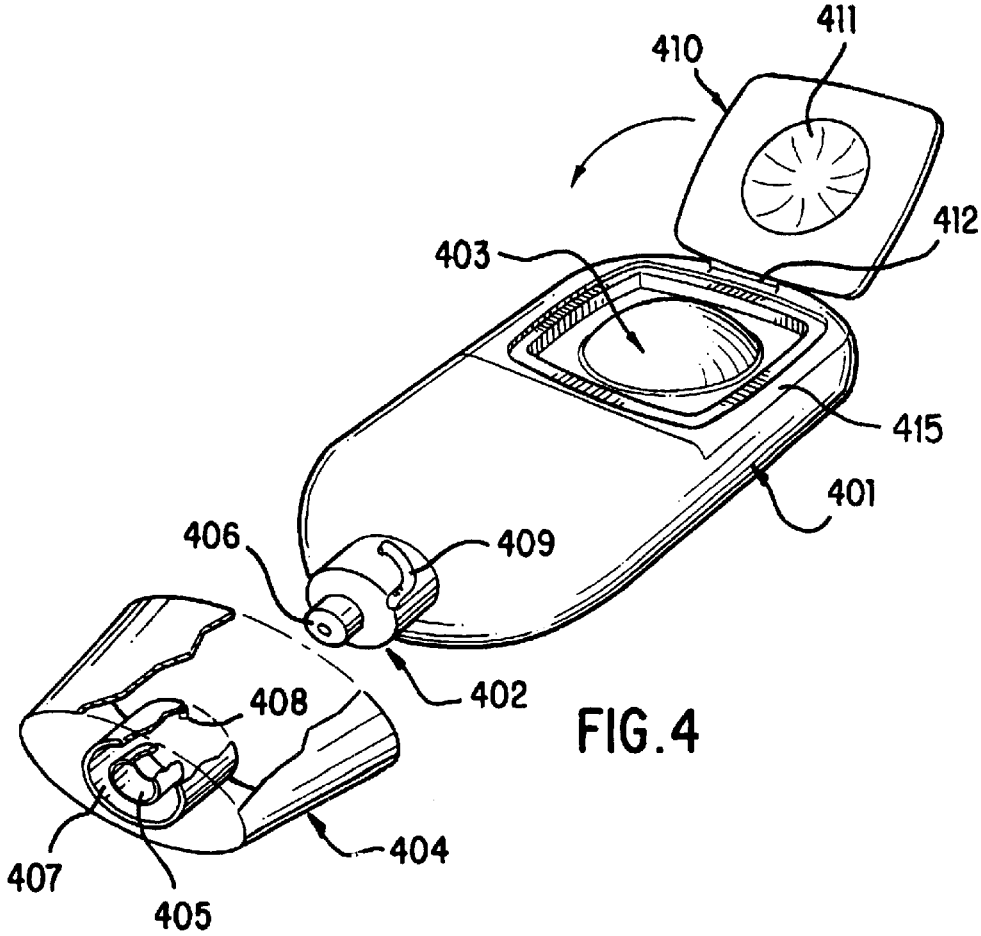
FIG. 4 is a perspective view of a bottle in accordance with the invention whose pressure-increasing means is protected by a hinged lid.

The device shown in FIG. 4 is constituted by a body provided with two openings. It ends on one side in a constrictor 402 and on the other in a neck connected to an elastomeric bulb 403 by means of a fixing means. Two parts 401 and 415 are made of a rigid material and have a single profile. The bulb 403 is level with the surface of the part 415. Cover cap 404 is provided with a sealing skirt 405. The end of the constrictor 406 is fitted within a skirt 407 for fixing the cover cap on the constrictor. Skirt 407 and constrictor 406 are provided with complementary fastening means 408, 409 defining a bayonet-type fastening.

The body of the bottle is partly overmolded by the part 401 which has a recess around the bulb 403. The part 415 is fixed by catch-engagement in this recess. The part 401 forms a single uniform profile in cooperation with the cover cap 404. The part 415 has a lid 410 with a hinge 412 that covers the bulb 403 in the closed position. The lid 410 has a relief 411 capable of following the shapes of the bulb.

According to a variant, provision may be made for the end of the constrictor which is inserted in the internal skirt of the cover cap 405 to rest on a gasket so as to ensure a leakproof seal, the gasket making it possible to prevent any low pressure from forming in the bottle when it is opened.

Figure 5A:
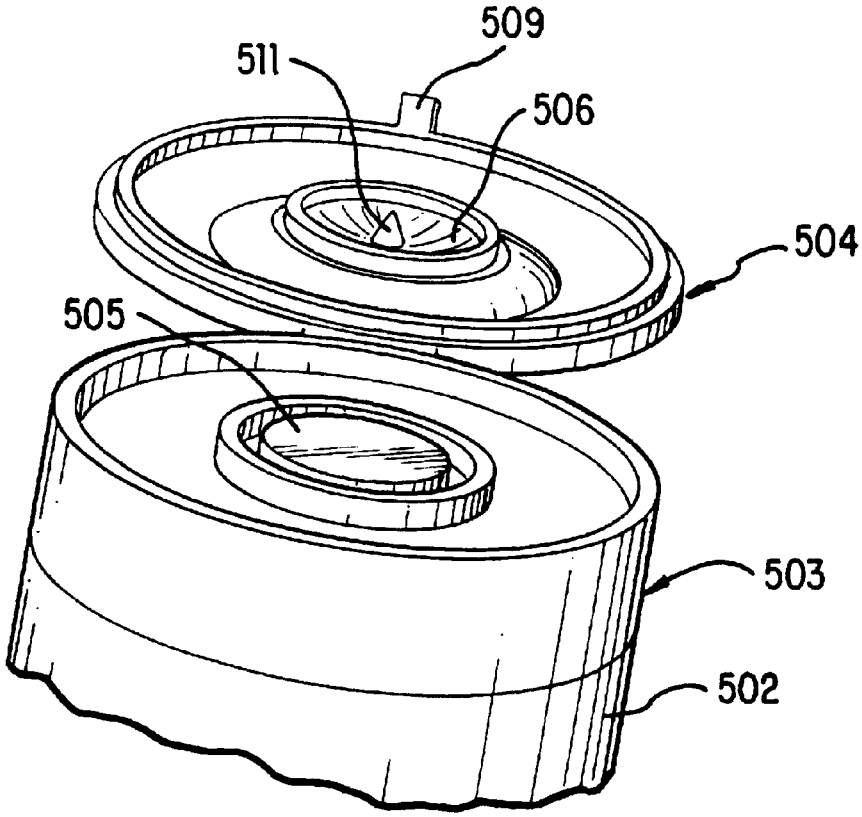
FIGS. 5A and 5B show, in perspective and in partial cross-section, a device in accordance with the invention whose bulb is placed on a hinged lid.
Figure 5B:
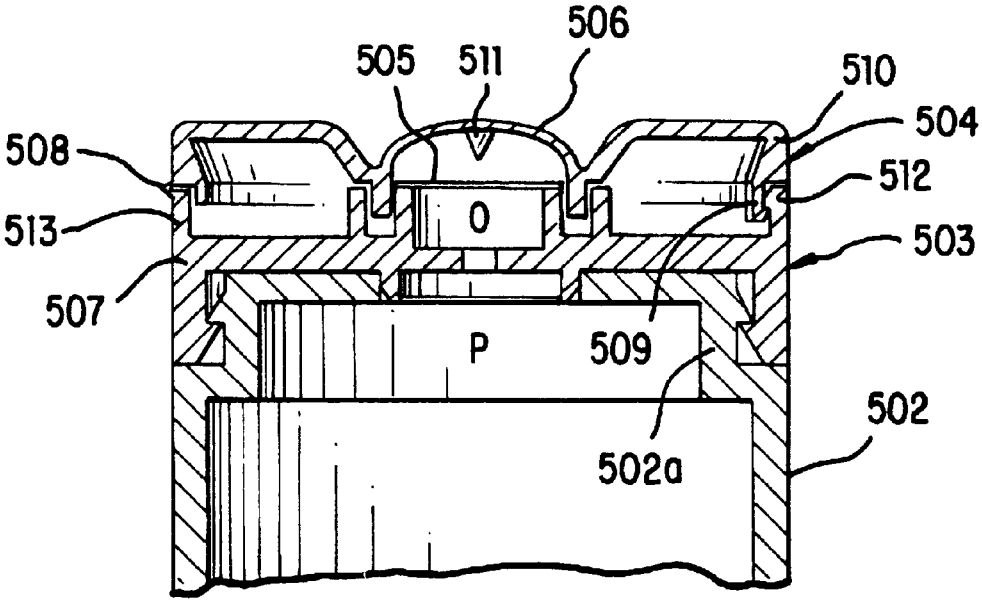

The device shown in FIGS. 5A and 5B has a body 502 provided with two openings. It ends at one side in a constrictor (not shown) and on the other side (P) in a neck 502a on which there is fixed a rigid part 503 made of polyethylene. The part 503 has a lid 504 including a bulb 506 made of polyethylene, the thickness of whose walls is less than that of the lid 504. The part 503 carries a cover 505 and is molded therewith as one piece to form a body 507 having skirt 513. The hinge 508 connects the lid and the body.

The body 507 is fixed on the neck 502a of the bottle (by catch-engagement) and has an opening O which extends the opening P of the bottle. This opening O is obturated by the cover foil of aluminum welded to the body 507. The lid 504 has a fastening means 509 allowing it to be fastened to the body 507 which is provided with complementary fastening means 512, and a skirt 510 which cooperates in a leakproof manner with the skirt 513 of the body so that when the lid 504 is closed, the bottle is ready for use.

The bulb 506 is positioned in such a way that in the closed position it is opposite the opening O. The bulb 506 is provided with a striker 511 so that when the cover cap 504 is closed and pressure is exerted on the bulb, the striker 511 tears the obturator 505. This pressure causes the product to emerge through the end of the bottle on the opposite side to the opening P. The unit has a symmetry of revolution.

Figure 6A:
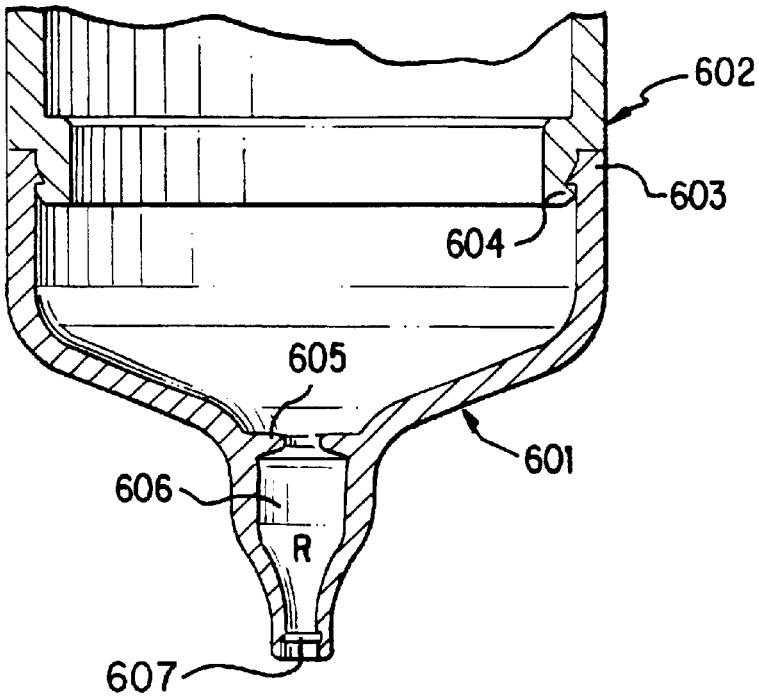
FIGS. 6A and 6B show, in cross-section and in enlarged cross-section, a constrictor comprising a retaining cell.
Figure 6B:
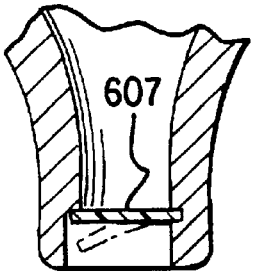

The constrictor 601 of FIGS. 6A and 6B cooperates with the body 602 of the bottle by fastening means 603 complementary to those 604 with which the body of the bottle is fitted. The constrictor 601 is provided on its internal circumference with an annular bead 605 which defines a retaining cell 606. Thus, even if the bottle is stored in a position other than vertical, there always remains at least one product dose in the cell ready for dispensing. The outlet R of the constrictor is obturated by an elastic lip 607 made of an elastomer which retains the product in the absence of a pressure increase in the reservoir. This device functions in the same way as those described above.

Figure 6C:
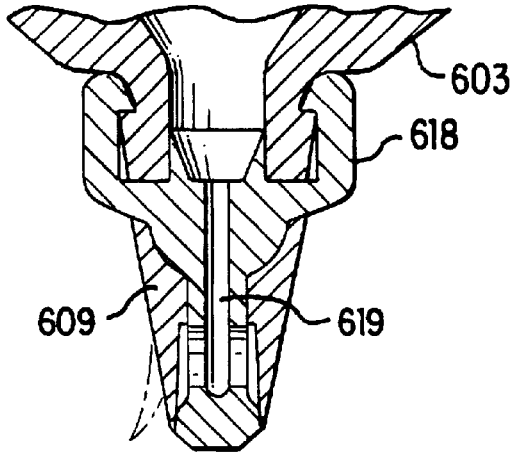
FIG. 6C shows a cross-sectional view of one end of the constrictor.

In the variant shown in FIG. 6C, a circular valve 609 made of an elastomer is molded on a part 618 fixed on the constrictor 603 and traversed by the duct 619. This valve ensures the sealing of the unit.

Figure 7A:
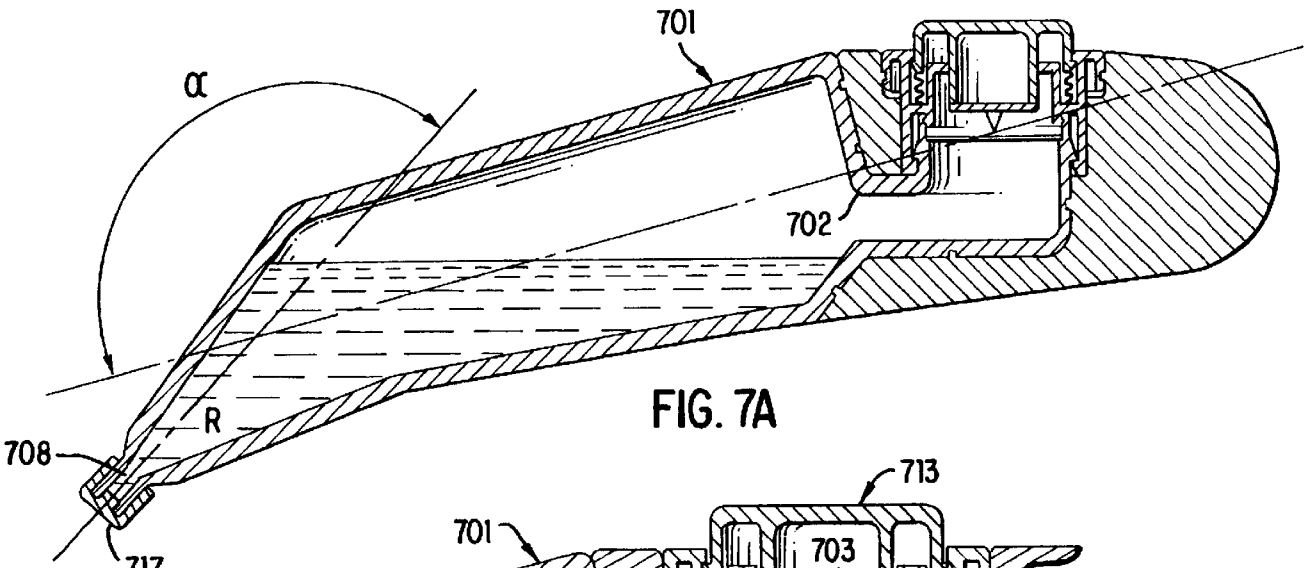
FIGS. 7A and 7B show in a longitudinal section and an enlarged longitudinal section, a device in accordance with the invention for horizontal storage.
Figure 7B:
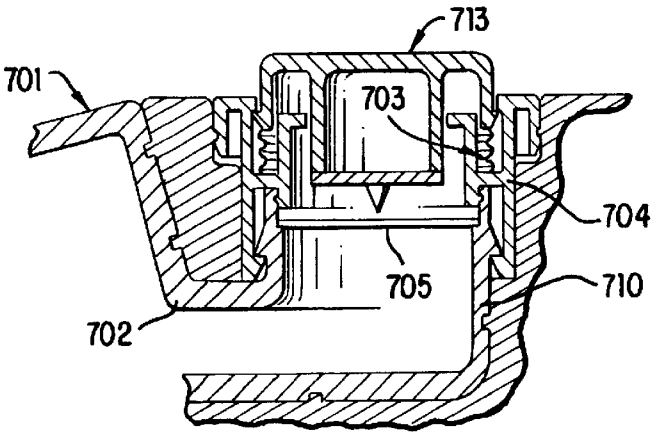

The device shown in FIG. 7 differs from the preceding ones in that it is arranged to be positioned flat on a support in the direction of its largest dimension. For this purpose, the neck 710 of the bottle 701 which is obturated by a tearable obturating cover 705 has an elbow 702. The pressure-increasing means comprises a bellows 703 joined to the neck 710 by ring-type fixing means 704. This bellows is surmounted by a rigid push button 713. The outlet end R has a constrictor 708 whose longitudinal axis forms an angle $90° < \alpha < 180°$ relative to the axis of the body of the bottle. The end R is obturated by a stopper 717.

Figure 8A:
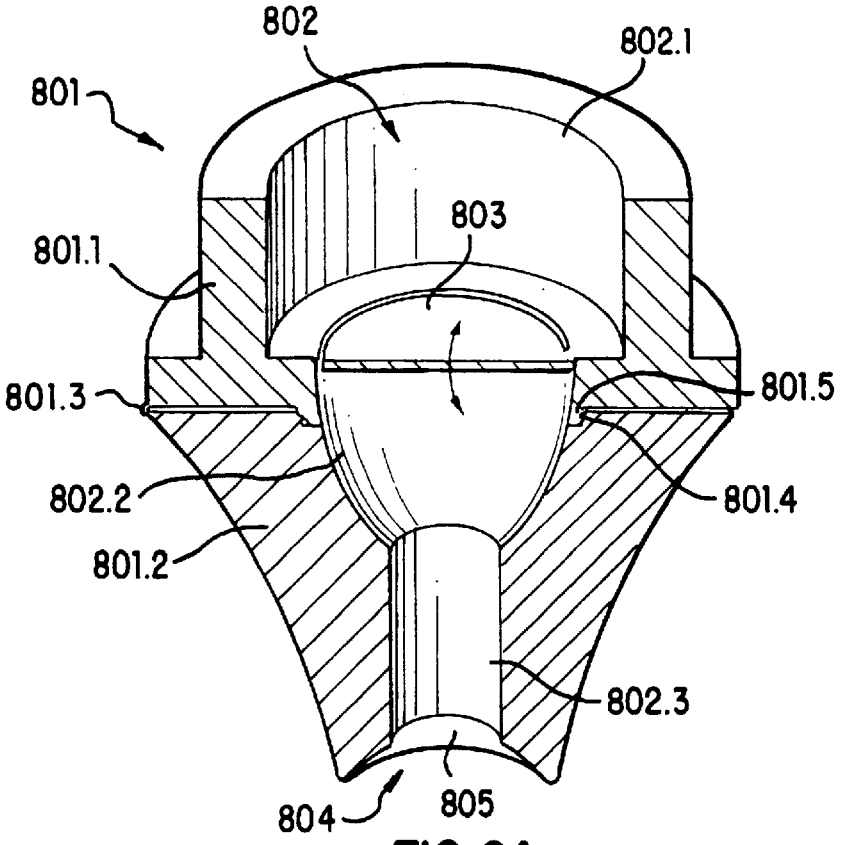
FIGS. 8A and 8B are longitudinal and cross-sectional views, respectively, of an end fitting that can be fitted on the device in accordance with the invention.
Figure 8B:
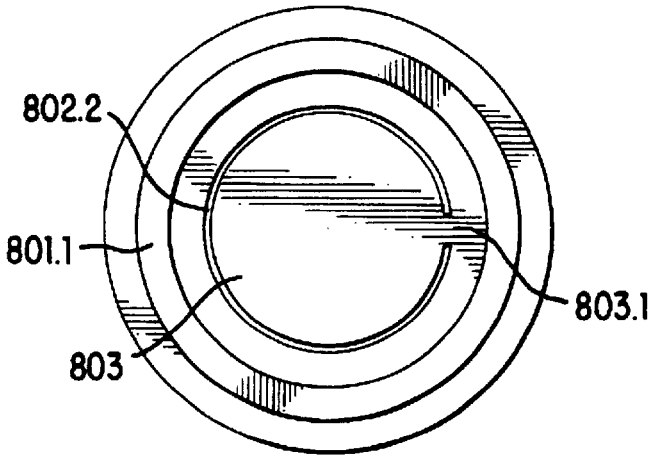

According to a variant of the invention, the bottle may be provided at its dispensing end with an end fitting such as shown in FIGS. 8A and 8B. The end fitting 801 shown in these Figures is constituted by two parts: the first part 801.1 has fastening means (not shown) for fastening it on the constrictor of the bottle (for example by a force-fit). The part 801.1 is connected by means of a flap hinge 801.3 to the second part 801.2 of the end fitting. The parts 801.1 and 801.2 have fastening means 801.4, 801.5 allowing them to be held fixed one against the other in their use position, as well as sealing means (not shown). Provision could also be made for the end fitting 801 to be constituted as a single part corresponding to the two parts 801.1 and 801.2 held in a fixed position.

The end fitting 801 is traversed by a duct 802 comprising three parts. The upper duct 802.1 communicates with the inside of the bottle. A two-way flap valve 803 separates the upper duct 802.1 from the median duct 802.2. The lower duct 802.3 extends the median duct 802.2 and opens towards the outside of the bottle. The width of the duct 802 is reduced in the direction from the inlet of the duct 802 inside the bottle towards the outlet of the duct 802. The median duct 802.2 has a greater width at the level of the valve 803 and is narrower at the level of the lower duct 802.3. The lower duct 802.3 is over its whole length narrower than the median duct 802.2.

The part 801.2 has a concave profile 804 at the level of the opening 805 of the lower duct 802.3, this profile 804 being placed around, and substantially perpendicular to, the opening 805. The two-way flap valve 803 is fastened to the part 801.1 by a flap hinge 803.1. The width and the thickness of this hinge 803.1 make it possible to regulate the force required for displacing the valve 803.

In FIG. 8B, which is a cross-section of the end fitting at the level of the valve 803, it can be seen that the width of the valve 803 relative to the duct 802.2 at the level of the valve also affects the flow rate through the duct 802.

This device makes it possible to improve the renewed air intake effect. It also makes it possible to prevent the formation of drops at the opening 805 of the bottle. It permits a more uniform dispensing.

Obviously, numerous modifications and variations of the present invention are possible in light of the above teachings. It is therefore to be understood that the invention may be practiced otherwise than as specifically described herein.

What is claimed is:

1. A dispensing bottle, comprising:

a reservoir body containing a product reservoir and provided with at least two openings, a first of said openings ending in a neck;

means at said neck for increasing the pressure in the reservoir;

a constrictor at said second opening for substantially preventing the product from flowing through said second opening in the absence of pressure from the pressure increasing means;

means for fixing the pressure-increasing means on the first opening of the reservoir; and sealing means for sealing said first opening so as to prevent discharge of the product through the first opening.

2. A bottle according to claim 1 including a cover cap mountable to the second end of the bottle.

3. A bottle according to claim 1 wherein the reservoir body has a rigidity sufficient that the reservoir body is not deformed during use.

4. A bottle according to claim 1 wherein the body of the bottle is made of one from the group consisting of glass, thermoplastic material and aluminum.

5. A bottle according to claim 1 wherein the product reservoir contains one of a lotion, a milk, a shampoo, a cream and a foam.

6. A bottle according to claim 1 wherein the capacity of the pressure-increasing means is less than the volume of the bottle.

7. A bottle according to claim 6 wherein the capacity of the pressure-increasing means ranges from 0.2% to 25% of the volume of the bottle.

8. A bottle according to claim 1 wherein the capacity of the pressure-increasing means is in the range of from 0.1 ml to 5 ml.

9. A bottle according to claim 1 wherein the pressure-increasing means is comprised by one of a bulb made of an elastomeric material, a piston, and a bellows.

10. A bottle according to claim 1 wherein the pressure-increasing means is connected to the first opening by one of catch-engagement and screwing.

11. A bottle according to claim 1 wherein the pressure-increasing means is comprised by a bellows surmounted by a push button made of a rigid material.

12. A bottle according to claim 1 wherein the pressure-increasing means, the fixing means and the neck form a unit partly encapsulated in a rigid part.

13. A bottle according to claim 12 wherein the encapsulation comprises overmolding of the rigid part around the unit formed by the pressure-increasing means, the fixing means and the neck.

14. A bottle according to claim 12 wherein the rigid part and the elastomeric bulb are a single piece.

15. A bottle according to claim 12 wherein the rigid part is comprised by two separate parts assembled around the unit formed by the pressure-increasing means, the fixing means and the neck.

16. A bottle according to claim 12 wherein the rigid part is made of a thermoplastic material.

17. A bottle according to claim 12 wherein the rigid part comprises a cover cap for protecting the pressure-increasing means.

18. A bottle according to claim 1 including a rigid part partly overmolding the pressure-increasing means, the fixing means, and the neck in such a way that the pressure-increasing means is situated inside a hollow cavity in the rigid part and that the pressure-increasing means does not extend above the surface of the rigid part.

19. A bottle according to claim 1 wherein the bottle has two pressure-increasing means positioned symmetrically relative to the first opening.

20. A bottle according to claim 1 wherein the constrictor comprises a retaining cell open towards the reservoir.

21. A bottle according to claim 20 wherein the retaining cell is formed by the walls of the constrictor.

22. A bottle according to claim 20 including an annular flange at an inlet of the retaining cell.

23. A bottle according to claim 1 wherein the constrictor has a dispensing end, further comprising an obturating means for intermittently obturating said dispensing end of the constrictor.

24. A bottle according to claim 23 wherein said obturating means comprises one of an elastic lip, an elastic valve, a flat deformable gasket placed at the bottom of the cover cap, and a service cap forming part of the cover cap.

25. A bottle according to claim 1 including one of a foam applicator, a ball, a spatula and a brush at one end of the constrictor.

26. A bottle according to claim 1 wherein the constrictor has plural ducts for the simultaneous dispensing of the product.

27. A bottle according to claim 1 wherein the pressure-increasing means is fixed on the neck by at least one of the pressure-increasing means itself or a rigid ring.

28. A bottle according to claim 12 wherein the rigid part has a hinged lid, the pressure-increasing means being secured to said lid.

29. A bottle according to claim 1 wherein the sealing means is semipermanent.

30. A bottle according to claim 1 wherein the sealing means has a membrane which is permeable to air and is impermeable to liquids.

31. A bottle according to claim 1 including an air restoring means.

32. A bottle according to claim 2 wherein the cover cap has a flat face which allows the bottle to be stored upside down.

33. A bottle according to claim 1 wherein the pressure-increasing means and the reservoir communicate via a capillary duct.

34. A bottle according to claim 1 including an end fitting traversed by a duct, and a two-way flap valve separating the duct into two ducts, of which one duct communicates with the inside of the bottle and the other duct is a median duct which is extended in a lower duct having an opening to the outside of the bottle.

35. A bottle according to claim 34 wherein the end fitting has a concave profile at the opening of the lower duct.

36. A dispensing bottle, comprising:

a reservoir body containing a product reservoir and provided with at least two openings, a first of said openings ending in a neck;

means at said neck for increasing the pressure in the reservoir;

a constrictor at said second opening for substantially preventing the product from flowing through said second opening in the absence of pressure from the pressure increasing means;

means for fixing the pressure-increasing means on the first opening of the reservoir; and a sealing device for sealing said first opening so as to prevent discharge of the product through the first opening, wherein the sealing device comprises an obturating cover tearable or pierceable during the first use by actuating the pressure increasing means.

37. A bottle according to claim 36 wherein the obturating cover is made of a material impermeable to air and to the constituents of the product and is chemically inert in relation to the product.

38. A dispensing bottle, comprising:

a reservoir body containing a product reservoir and provided with at least two openings, a first of said openings ending in a neck;

means at said neck for increasing the pressure in the reservoir;

a constrictor at said second opening for substantially preventing the product from flowing through said second opening in the absence of pressure from the pressure increasing means;

means for fixing the pressure-increasing means on the first opening of the reservoir;

a sealing device for sealing said first opening so as to prevent discharge of the product through the first opening; and air restoring means comprising one of a cap having means for renewed air intake, a lip, an elastic valve, a renewed air intake valve mounted between the pressure increasing means and the ambient air, and a hole formed in the pressure increasing means.

39. A dispensing bottle, comprising:

a reservoir body containing a product reservoir and provided with at least two openings, a first of said openings ending in a neck;

means at said neck for increasing the pressure in the reservoir;

a constrictor at said second opening for substantially preventing the product from flowing through said second opening in the absence of pressure from the pressure increasing means;

means for fixing the pressure-increasing means on the first opening of the reservoir; and sealing means for sealing said first opening so as to seal said first opening at least prior to a first use of the dispensing bottle.

40. A dispensing bottle according to claim 39, wherein said sealing means defines in combination with said pressure increasing means, at least one compartment that, at least prior to the first use of the dispensing bottle, is tightly separated from said reservoir.

*41. A dispenser comprising:*

*a reservoir body;*

*a product reservoir contained in the reservoir body;*

*at least a first opening and a second opening intended to be in flow communication with the product reservoir;*

*means for increasing pressure in the reservoir via the first opening;*

*a constrictor for substantially preventing the product from flowing through said second opening in the absence of pressure from the pressure increasing means; and*

*sealing means for sealing said first opening so as to prevent discharge of the product through the first opening.*

*42. The dispenser of claim 41, wherein the product reservoir contains one of a lotion, a milk, a shampoo, a cream, a foam, a paste, a gel, and a loose powder.*

*43. The dispenser of claim 41, wherein the capacity of the pressure increasing means is less than the volume of the product reservoir.*

*44. The dispenser of claim 41, wherein the pressure increasing means comprises one of a bulb made of an elastomeric material, a piston, and a bellows.*

*45. The dispenser of claim 41, wherein the pressure increasing means comprises a bellows surmounted by a push button made of a rigid material.*

*46. The dispenser of claim 41, further comprising a lid configured to protect the pressure increasing means.*

*47. The dispenser of claim 41, wherein the sealing means is semipermanent.*

*48. The dispenser of claim 41, wherein the sealing means comprises a membrane permeable to air and impermeable to liquids.*

*49. The dispenser of claim 41, further comprising air restoring means.*

*50. The dispenser of claim 41, further comprising a capillary duct intended to provide flow communication between the pressure increasing means and the product reservoir.*

*51. The dispenser of claim 41, wherein the reservoir body is substantially rigid such that the reservoir body is not deformed during use of the dispenser.*

*52. The dispenser of claim 41, wherein the reservoir body includes the first opening and the second opening.*

*53. The dispenser of claim 52, wherein the reservoir body includes a neck defining the first opening.*

*54. The dispenser of claim 53, wherein the pressure increasing means is on the neck.*

*55. The dispenser of claim 53, wherein the sealing means is connected to the neck.*

*56. The dispenser of claim 52, further comprising a cover cap mountable to an end of the reservoir body including the second opening.*

*57. The dispenser of claim 41, further comprising a part coupling the pressure increasing means to the reservoir body.*

*58. The dispenser of claim 57, wherein the sealing means is connected to the coupling part.*

*59. The dispenser of claim 57, wherein the coupling part includes the first opening.*

*60. The dispenser of claim 41, wherein the sealing means comprises a part movable with respect to the reservoir body.*

*61. The dispenser of claim 60, wherein the movable part includes a duct, the movable part being movable between a first position wherein the duct is placed in flow communication with the reservoir and a second position wherein the duct lacks flow communication with the reservoir.*

*62. The dispenser of claim 60, wherein the pressure increasing means is provided on the movable part.*

*63. The dispenser of claim 60, further comprising a part fixed to the reservoir body, wherein the movable part is movably provided on the fixed part.*

*64. The dispenser of claim 63, wherein the movable part is rotatably provided on the fixed part.*

*65. The dispenser of claim 63, wherein the fixed part includes the first opening.*

*66. The dispenser of claim 60, wherein the movable part is rotatable with respect to the reservoir body.*

*67. The dispenser of claim 41, wherein the sealing means comprises an obturating cover configured to be ruptured.*

*68. The dispenser of claim 41, wherein the pressure increasing means comprises a portion configured to rupture the obturating cover.*

*69. The dispenser of claim 41, wherein the sealing means comprises a non-return valve.*

*70. A dispenser comprising:*

*a reservoir body;*

*a product reservoir contained in the reservoir body;*

*at least a first opening and a second opening intended to be placed in flow communication with the product reservoir;*

*means for increasing pressure in the reservoir via the first opening;*

*a constrictor for substantially preventing the product from flowing through said second opening in the absence of pressure from the pressure increasing means; and*

*sealing means for sealing said first opening so as to seal said first opening at least prior to a first use of the dispenser.*

*71. The dispenser of claim 70, wherein the product reservoir contains one of a lotion, a milk, a shampoo, a cream, a foam, a paste, a gel, and a loose powder.*

*72. The dispenser of claim 70, wherein the capacity of the pressure increasing means is less than the volume of the product reservoir.*

*73. The dispenser of claim 70, wherein the pressure increasing means comprises one of a bulb made of an elastomeric material, a piston, and a bellows.*

*74. The dispenser of claim 70, wherein the pressure increasing means comprises a bellows surmounted by a push button made of a rigid material.*

*75. The dispenser of claim 70, further comprising a lid configured to protect the pressure increasing means.*

*76. The dispenser of claim 70, wherein the sealing means is semipermanent.*

*77. The dispenser of claim 70, wherein the sealing means comprises a membrane permeable to air and impermeable to liquids.*

*78. The dispenser of claim 70, further comprising air restoring means.*

*79. The dispenser of claim 70, further comprising a capillary duct intended to provide flow communication between the pressure increasing means and the product reservoir.*

*80. The dispenser of claim 70, wherein the reservoir body is substantially rigid such that the reservoir body is not deformed during use of the dispenser.*

*81. The dispenser of claim 70, wherein the reservoir body includes the first opening and the second opening.*

*82. The dispenser of claim 81, wherein the reservoir body includes a neck defining the first opening.*

*83. The dispenser of claim 82, wherein the pressure increasing means is on the neck.*

*84. The dispenser of claim 82, wherein the sealing means is connected to the neck.*

*85. The dispenser of claim 81, further comprising a cover cap mountable to an end of the reservoir body including the second opening.*

*86. The dispenser of claim 70, further comprising a part coupling the pressure increasing means to the reservoir body.*

*87. The dispenser of claim 86, wherein the sealing means is connected to the coupling part.*

*88. The dispenser of claim 86, wherein the coupling part includes the first opening.*

*89. The dispenser of claim 70, wherein the sealing means comprises a part movable with respect to the reservoir body.*

*90. The dispenser of claim 89, wherein the movable part includes a duct, the movable part being movable between a first position wherein the duct is placed in flow communication with the reservoir and a second position wherein the duct lacks flow communication with the reservoir.*

*91. The dispenser of claim 89, wherein the pressure increasing means is provided on the movable part.*

*92. The dispenser of claim 89, further comprising a part fixed to the reservoir body, wherein the movable part is movably provided on the fixed part.*

*93. The dispenser of claim 92, wherein the movable part is rotatably provided on the fixed part.*

*94. The dispenser of claim 92, wherein the fixed part includes the first opening.*

*95. The dispenser of claim 89, wherein the movable part is rotatable with respect to the reservoir body.*

*96. The dispenser of claim 70, wherein the sealing means comprises an obturating cover configured to be ruptured.*

*97. The dispenser of claim 70, wherein the pressure increasing means comprises a portion configured to rupture the obturating cover.*

*98. The dispenser of claim 70, wherein the sealing means comprises a non-return valve.*

*99. A dispenser comprising:*

*a reservoir body;*

*a product reservoir contained in the reservoir body;*

*at least a first opening and a second opening intended to be placed in flow communication with the product reservoir;*

*a pressurizing member configured to increase pressure in the reservoir via the first opening;*

*a constrictor configured to substantially prevent the product from flowing through said second opening in the absence of pressure from the pressurizing member; and*

*sealing means for sealing said first opening so as to prevent discharge of the product through the first opening.*

*100. A dispenser comprising:*

*a reservoir body;*

*a product reservoir contained in the reservoir body;*

*at least a first opening and a second opening intended to be placed in flow communication with the product reservoir;*

*a pressurizing member configured to increase pressure in the reservoir via the first opening;*

*a constrictor configured to substantially prevent the product from flowing through said second opening in the absence of pressure from the pressurizing member; and*

*sealing means for sealing said first opening so as to seal said first opening at least prior to a first use of the dispenser.*

* * * * *